US006539114B1

(12) United States Patent
Shimazawa

(10) Patent No.: US 6,539,114 B1
(45) Date of Patent: Mar. 25, 2003

(54) IMAGE PROCESSING APPARATUS

(75) Inventor: Yoichi Shimazawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/542,532

(22) Filed: Apr. 4, 2000

(30) Foreign Application Priority Data

Apr. 26, 1999 (JP) ............................................. 11-118338

(51) Int. Cl.⁷ .............................. G06K 9/46; G06K 9/66
(52) U.S. Cl. ......................... 382/195; 382/199; 382/226
(58) Field of Search ................................. 382/190, 195, 382/199, 203, 224, 226, 228

(56) References Cited

U.S. PATENT DOCUMENTS

| 5,202,935 | A | * | 4/1993 | Kanamori et al. | ........... | 382/162 |
| 5,216,724 | A | | 6/1993 | Suzuki et al. | ................... | 382/7 |
| 5,610,688 | A | * | 3/1997 | Inamoto et al. | .............. | 399/366 |
| 5,794,239 | A | * | 8/1998 | Walster et al. | .................. | 707/6 |
| 5,812,840 | A | * | 9/1998 | Shwartz | ......................... | 707/4 |
| 6,385,339 | B1 | * | 5/2002 | Yokota et al. | ............... | 382/181 |
| 6,396,950 | B1 | * | 5/2002 | Arai et al. | ................... | 382/181 |
| 6,424,989 | B1 | * | 7/2002 | Shaw et al. | .................. | 709/201 |

FOREIGN PATENT DOCUMENTS

JP 8287313 11/1996

* cited by examiner

Primary Examiner—Samir Ahmed
Assistant Examiner—Anand Bhatnagar
(74) Attorney, Agent, or Firm—Renner, Otto, Boisselle & Sklar

(57) ABSTRACT

An image processing apparatus having an image judgement section for judging whether or not a specific pattern image is included in at least a part of the image data input from an image input section, and a central processing unit for controlling the output of an image based on the judgement result by the image judgement section, wherein the image judgement section comprises a plurality of specific pattern image control tables for controlling different specific pattern images, respectively, and every time image data is input from the image data input section, the order of the plurality of specific pattern image control tables is changed over to perform the image judgement.

10 Claims, 6 Drawing Sheets

IMAGE PROCESSING APPARATUS

BACKGROUND OF THE INVENTION (1) Field of the Invention

The present invention relates to an image processing apparatus which outputs an image input from an input apparatus such as a document reader or the like from an output apparatus such as a printer or the like.

(2) Description of the Related Art

Recently, a digital color recorder (copying machine, printer or the like) which can record and reproduce a color image information as a color image with fidelity has been commercialized, so that the color image can be easily printed out.

Moreover, in convenience stores or the like, a copy service system connecting a copying machine and a coin vender so as to make a copy easily has been introduced in many places.

Recently, however, user's needs are diversified, an original document is not only a black/white, and information magazines uses color documents (information) in most cases, hence a copying machine which can easily make a color copy has been introduced for a copying service.

As described above, anybody can print out a color image easily by utilizing a digital color recorder which can record and reproduce a color image information as a color image with fidelity.

Hence, there is a possibility that a copy is made unduly using negotiable securities as an original document with the digital color copying machine, which is a banned deed, thus causing a problem.

Therefore, an apparatus disclosed in Japanese Patent Application Laid-Open Hei 8 No. 287313 has been proposed.

Briefly explaining, it relates to a technique for outputting an image while confirming that a color image information input from an original image scanning apparatus such as a scanner or the like is not negotiable securities, and in a reader for scanning the original document image by dividing it into a plurality of sections, judgement is precisely performed by changing over a judgement reference of an image (extraction of characteristics) sequentially, for every image information obtained by respective scanning.

Recently, however, with increase of paper currencies of each country due to market opening and speed up of copying, copying machines must perform precise judgement by comparing an original document with lots of specific pattern images and normally, must provide users a record as an output image in a short period of time.

However, if an apparatus incorporating a high image processing capability is used for high speed processing, the price increase becomes a problem.

SUMMARY OF THE INVENTION

The present invention is for solving the above-described problems and an object of the present invention is to provide an image processing apparatus which mounts a judgement apparatus which can reliably perform judgement of various paper currencies in a short period of time, without increasing the price of the apparatus.

With a view to attaining the above objects, the gist of the present invention is constructed as follows.

A first gist of the present invention is an image processing apparatus having: an image input section for inputting an image information; an image output section for reproducing and outputting an image, based on the image information input from the image input section; an image judgement section for judging whether or not a specific pattern image is included in at least a part of the image information input to the image input section; and a control section for controlling reproduction and output of an image by using the image output section, based on the judgement result obtained at the image judgement section, wherein the image processing apparatus further comprises a specific pattern image control section for controlling a plurality of specific pattern image information, the image judgement section performs the presence judgement, with respect to the image information input from the image input section, by changing the application order of the plurality of specific pattern image information to make it applicable.

A second gist of the present invention is an image processing apparatus having: an image input section for inputting an image information; an image output section for reproducing and outputting an image, based on the image information input from the image input section; an image judgement section for judging whether or not a specific pattern image is included in at least a part of the image information input to the image input section; and a control section for controlling reproduction and output of an image by using the image output section, based on the judgement result obtained at the image judgement section, wherein the image processing apparatus further comprises a specific pattern image control section for controlling a plurality of specific pattern image information, and a judgement order setting section for setting which specific pattern image information of the plurality of specific pattern image information is given priority and used for judging the image in sequence, and the image judgement section performs the presence judgement, with respect to the image information input from the image input section, by changing the application order of the plurality of specific pattern image information to make it applicable, based on the priority set by the judgement order setting section.

A third gist of the present invention is an image processing apparatus according to the second gist, wherein the judgement order setting section sets the priority of the plurality of specific pattern image information, depending upon the destination of the apparatus to be shipped or the environmental situation in which the apparatus is installed.

A fourth gist of the present invention is an image processing apparatus according to the second gist, wherein the judgement order setting section gives priority to a specific pattern image information whose frequency that has been judged as a specific pattern image is high, by controlling the judgement history of the image obtained at the image judgement section.

A fifth gist of the present invention is an image processing apparatus according to the second gist, wherein the judgement order setting section gives priority to a specific pattern image information which has been judged to be a specific pattern image by the previous image judgement by the image judgement section.

A sixth gist of the present invention is an image processing apparatus according to the first or second gist, wherein the image judgement section performs judgement while changing the specific pattern image information in sequence, with respect to the same image information repeatedly input from the image input section.

A seventh gist of the present invention is an image processing apparatus according to the first or second gist, wherein the image judgement section re-performs judgement by returning the specific pattern image information to the initial priority state, when the image information input from the image input section changes.

An eighth gist of the present invention is an image processing apparatus according to the first or second gist, wherein the specific pattern image information controlled by the specific pattern image control section is an image information regarding negotiable securities of each country.

According to the invention of the first gist, every time when an image information (original document image, electric image data or the like) is input from the image input section, the image judgement section performs judgement whether a specific pattern image is included or not in the image information, by changing the application order of a plurality of specific pattern image information and performing a pattern matching processing or the like using the specific pattern image information according to the application order.

First, a group of specific pattern image information including various characteristic information is divided into a plurality of specific pattern image information based on a predetermined rule for control, and the application order of the specific pattern image information used for the judgement such as the pattern matching processing or the like is optionally changed (that includes while changing and after being changed), thus enabling judgement processing.

Therefore, when judging the presence of the actually input image information by using each specific pattern image information, when it can be estimated or judged that there is a high possibility of the input image information matching any specific pattern image information, it is possible to use the specific pattern image information in an order of high probability for the presence judgement. If the input image information is applicable to the specific pattern image in an earlier stage, it is possible to omit the subsequent presence judgement with the specific pattern image information, to thereby improve the efficiency of the processing speed.

Accordingly, smooth judgement and reproduction/output processing can be performed by performing the presence judgement by using a hierarchical processing in which the group of specific pattern image information is divided into plural numbers for control and the divided and controlled plurality of specific pattern image information is applied in an optional order, rather than by using the group of specific pattern image information controlled in a fixed format such as simply by an input order sequentially at all times from the top for the image judgement such as pattern matching or the like.

Moreover, the product price can be also suppressed without mounting a high-level processing (judgement) apparatus to the copying machine, since more image information such as negotiable securities or the like can be judged in a short period of time with a simple construction.

According to the invention of the second gist, the image judgement section comprises a specific pattern image control section for controlling a plurality of specific pattern image information, and a judgement order setting section for setting which specific pattern image information of the plurality of specific pattern image information is given priority and used for judging the image in sequence. Hence, every time when an image information (original document image, electric image data or the like) is input from the image input section, the image judgement section can change the specific pattern image information in sequence in the order of high probability, as a first stage, and as a second stage, performs judgement of the image according to the order.

That is to say, first by dividing a group of specific pattern image information into a plurality of specific pattern image information for control based on a predetermined rule, it becomes possible to perform pattern matching processing or the like by applying the specific pattern image information in an order based on the priority.

Then, when judging an actually input image information using the specific pattern image information, it is possible to use the specific pattern image information for judging the presence of the specific pattern image information in the order of high probability based on the priority. If the input image information is applicable to the specific pattern image in an earlier stage, it is possible to omit the subsequent presence judgement with the specific pattern image information, to thereby improve the efficiency of the processing speed.

Accordingly, smooth judgement and output processing can be performed by dividing a group of specific pattern image information groups into a plurality of specific pattern image information for control, setting a priority and performing a search judgement processing such as a pattern matching processing or the like based on the priority, rather than by using the pattern image information controlled in a fixed format such as simply by an input order for the image judgement such as pattern matching or the like sequentially at all times.

Moreover, since many pattern image information such as negotiable securities or the like can be judged in a short period of time with a simple construction, the product price can be suppressed without mounting a high-level processing (judgement) apparatus to the copying machine.

According to the invention of the third gist, of the plurality of specific pattern image information, any specific pattern image information can be optionally set to be given priority and used for judgement depending upon the environment where the apparatus is installed, hence the precision of judgement can be improved.

According to the invention of the fourth gist, of the plurality of specific pattern image information, which information is given priority and used for judgement can be set from the previous judgement history, hence characteristics of an image having a possibility of being input frequently can be reliably judged, and as a result, precision of judgement can be improved (illegal act can be suppressed).

According to the invention of the fifth gist, of the plurality of specific pattern image information, which control section is given priority and used for judgement can be set based on the previous judgement result, hence considering there is a possibility of inputting the same image information repeatedly, precision of judgement can be improved (illegal act can be suppressed) as a result.

According to the invention of the sixth gist, by judging the image while changing the plurality of specific pattern image information, with respect to the same image information repeatedly input, detection accuracy can be improved, and massive forgery of negotiable securities or the like can be prevented beforehand. Also, the product price can be suppressed without mounting a high-level processing apparatus to the copying machine, in order to judge many specific pattern images such as negotiable securities or the like in a short period of time.

According to the invention of the seventh gist, when new image information is input, specific pattern image information serving as a reference, of information control sections regarding a plurality of specific pattern image information, is used for judgement, hence the judgement level can be made the same with respect to all image information.

According to the invention of the eighth gist, since a plurality of specific pattern image information is divided into each country, to thereby collectively control the image information regarding negotiable securities (paper currencies) of that country, control of various information serving as the reference for judgement is easily understood, and maintenance such as addition of new information can be made easily.

DESCRIPTION OF THE PREFERRED EMBODIMENTS

As follows is a description of an embodiment of the present invention with reference to the accompanying drawings.

Figure 1:
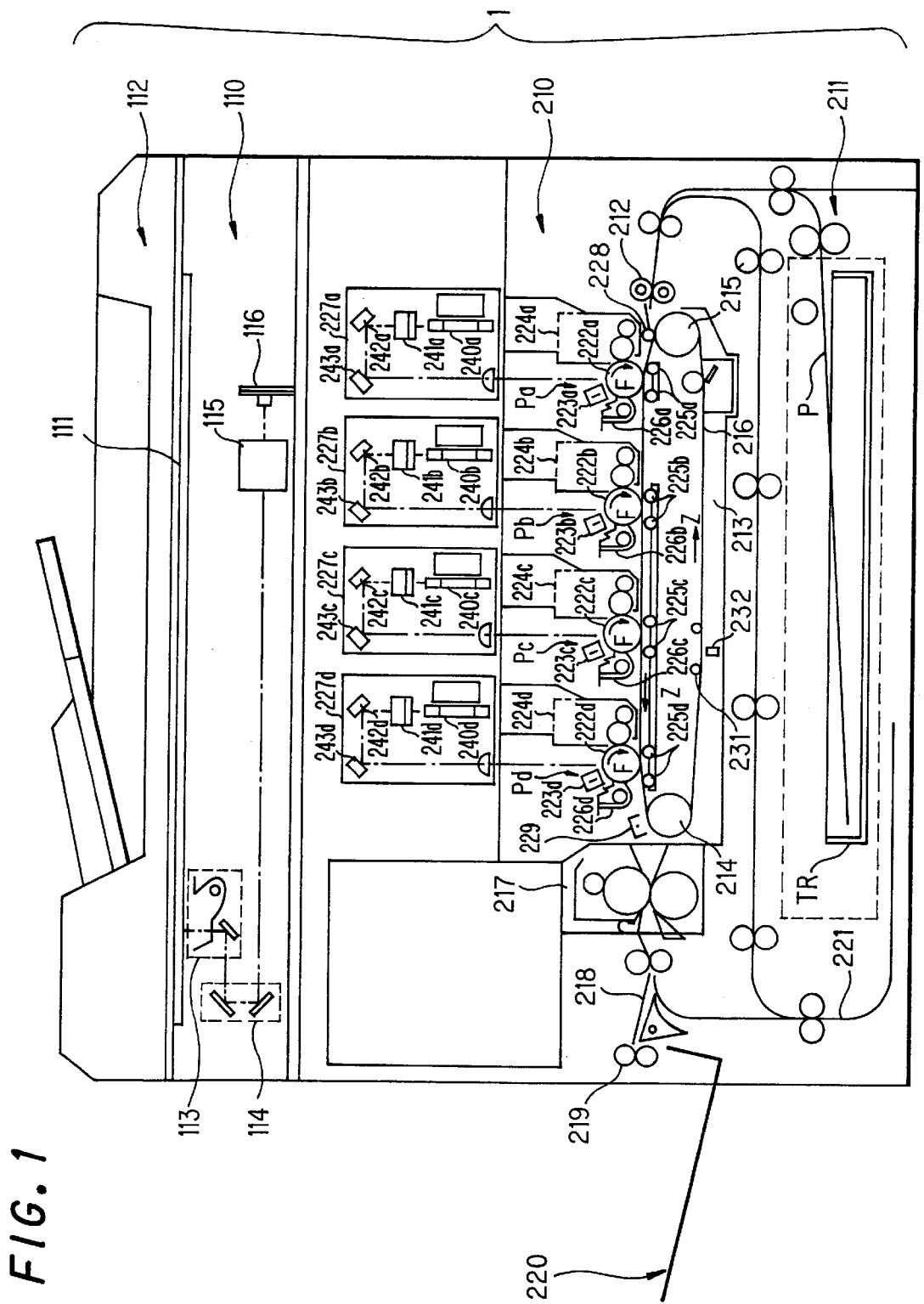
FIG. 1 is a sectional view of a digital color copying machine according to an embodiment of the present invention.

One embodiment of the present invention will be described as follows based on FIG. 1 to FIG. 6. FIG. 1 is a schematic front sectional view showing a construction of a digital copying machine 1 which is an image forming apparatus according to an embodiment of the present invention.

The construction is such that on the upper face of the copying machine body 1, an original table 111 and an operation panel described later are disposed, and an image reading section 110 and an image forming section 210 are disposed inside of the copying machine body 1.

Moreover, on the upper face of the original table 111, there is mounted a reversing automatic document feeder (RADF) 112 supported in a state which can be opened and closed with a predetermined positional relation with respect to the original table 111.

Furthermore, the reversing automatic document feeder 112 first carries a document so that one side of the document faces the image reading section 110 at a predetermined position of the document table 111, and after completing image reading of the one side thereof, reverses and carries the document toward the document table 111 so that the other side faces the image reading section 110 at a predetermined position of the document table 111.

Then, after completion of image reading of the both sides of one document, the reversing automatic document feeder 112 discharges this document, and executes double sides carrying operation for the next document.

The document carrying operation and the reversing operation of the document as described above is controlled in association with the overall operation of the copying machine 1.

The image reading section 110 is disposed below the document table 111 so as to read the document image carried onto the document table 111 by the reversing automatic document feeder 112.

The image reading section 110 has document scanning bodies 113, 114 reciprocating in parallel along the lower face of the document table 111, an optical lens 115, and a CCD line sensor 116 which is a photoelectric transducer.

The document scanning bodies 113, 114 comprise a first scanning unit 113 and a second scanning unit 114, and the first scanning unit 114 has an exposure lamp for exposing the surface of the document image and a first mirror deflecting a reflected optical image from the document toward a predetermined direction, and reciprocates in parallel at a predetermined scanning speed, while maintaining a certain distance with respect to the lower face of the document table 111. Also the second scanning unit 114 has a second mirror and a third mirror for further deflecting a reflected optical image from the document deflected by the first mirror of the first scanning unit 113 toward a predetermined direction, and reciprocates in parallel while maintaining a certain speed relationship with the first scanning unit 113.

The optical lens 115 is to reduce the reflected optical image from the document which has been deflected by the third mirror of the second scanning unit, so that the reduced optical image is imaged at a predetermined position on the CCD line sensor 116.

The CCD line sensor 116 is to photoelectrically convert the imaged optical image in sequence and output it as an electric signal. The CCD line sensor 116 is a three-line color CCD which can read a black and white image or a color image and output a line data color-separated into respective color components of R (red), G (green) and B (blue). The document image information converted to an electric signal by means of the CCD line sensor 116 is transferred to an image processing section described later and subjected to a predetermined image data processing.

Next is a description of the construction of the image forming section 210, and the construction of respective sections affecting the image forming section 210.

First, below the image forming section 210, there is disposed a paper feed mechanism 211 for separating papers (recording media) P loaded and stored in a paper tray and feeding it one by one toward the image forming section 210.

Then, the paper P separated and fed one by one is carried to the image forming section 210, with the feed timing being controlled by a pair of resist rollers 212 disposed in front of the image forming section 210.

Moreover, the paper P on one side of which an image has been formed is fed and carried again to the image forming section 210 with the timing being adjusted to the image formation of the image forming section 210.

Below the image forming section 210, there is disposed a transfer carrier belt mechanism 213. This transfer carrier belt mechanism 213 has such a construction that the paper P is electrostatically attracted to and carried on the transfer carrier belt 216 laid across in a tensioned condition between a drive roller 214 and a driven roller 215 so as to extend approximately in parallel. A pattern image detection unit 232 is disposed close to the lower side of the transfer carrier belt 216.

Furthermore, on the downstream side of the transfer carrier belt mechanism 213 in the paper carrier passage, there is disposed a fixing apparatus 217 for fixing a toner image transferred and formed on the paper P onto the paper P. The paper P passing through a nip portion between a pair of fixing rollers of the fixing apparatus 217 is discharged onto a discharge tray 220 attached to an outside wall of the copying machine body 1 by means of a discharge roller 219, through a carrying direction changeover gate 218.

The changeover gate 218 is for selectively changing over the carrier route of the paper P after fixation, between a route for discharging the paper P to the copying machine body 1, and a route for re-supplying the paper P toward the image forming section 210. The paper P whose carrying direction is changed over toward the image forming section 210 again by the changeover gate 218 is reversed via a switchback carrier route 221 and re-supplied to the image forming section 210.

In addition, above the transfer carrier belt 216 in the image forming section 210, there are provided in proximity in a row arrangement a first image forming station Pa, a second image forming station Pb, a third image forming station Pc and a fourth image forming station Pd in an order of from the upstream side in the paper carrier passage.

The transfer carrier belt 216 is friction-driven by the drive roller 214 in the direction of an arrow Z shown in FIG. 1, supports the paper P fed through the paper feed mechanism 211 described above, and carries the paper P to the image forming stations Pa to Pd sequentially.

Respective image stations Pa to Pd have substantially the same construction. Each image station Pa to Pd includes a photosensitive drum 222a, 222b, 222c and 222d rotated and driven in the direction of an arrow F shown in FIG. 1, respectively.

Around respective photosensitive drums 222a, 222b, 222c and 222d, chargers 223a, 223b, 223b and 223d for uniformly charging the respective photosensitive drums 222a, 222b, 222c and 222d; developing apparatuses 224a, 224b, 224c and 224d for developing an electrostatic latent image formed on the photosensitive drums 222a, 222b, 222c and 222d, respectively; transfer dischargers (transfer rollers) 225a, 225b, 225c and 225d for transferring the toner image developed on the photosensitive drums 222a, 222b, 222c and 222d to the paper P; and cleaning apparatuses 226a, 226b, 226c and 226d for eliminating residual toner on the photosensitive drums 222a–222d are respectively arranged in sequence, one each, along the rotation direction of the photosensitive drums 222a, 222b, 222c and 222d.

Moreover, laser beam scanner units 227a, 227b, 227c and 227d are respectively provided above each photosensitive drum 222a, 222b, 222c and 222d.

These laser beam scanner units 227a, 227b, 227c and 227d comprise respectively: a semiconductor laser element (not shown) for emitting dot light modulated according to the image data; polygon mirrors (deflectors) 240a to 240d for deflecting the laser beam from the semiconductor laser element in the main scanning direction; fθ lenses 241a to 241d and mirrors 242a to 242d and 243a to 243d for imaging the laser beam deflected by the polygon mirrors 240a to 240d on the surface of the photosensitive drums 222a to 222d.

To the laser beam scanner 227a is input a pixel signal corresponding to the black color component image of the color document image, to the laser beam scanner 227b is input a pixel signal corresponding to the cyan color component image of the color document image; to the laser beam scanner 227c is input a pixel signal corresponding to the magenta color component image of the color document image; and to the laser beam scanner 227d is input a pixel signal corresponding to the yellow color component image of the color document image.

An electrostatic latent image corresponding to the document image information color-converted in foregoing manner is formed on each photosensitive drum 222a to 222d, respectively. In addition, a black toner is stored in the developing apparatus 227a, a cyan toner is stored in the developing apparatus 227b, a magenta toner is stored in the developing apparatus 227c and a yellow toner is stored in the developing apparatus 227d. The electrostatic latent images on the photosensitive drums 222a to 222d are developed by these color toners. Hence, the document image information color-converted by the image forming section 210 is reproduced as a toner image of each color.

Furthermore, a charger (charging roller) 228 for attracting papers is disposed between the first image forming station Pa and the paper feed mechanism 211, and this paper attracting charger 228 charges the surface of the transfer carrier belt 216, and the paper P fed from the paper feed mechanism 211 is carried between the first image forming station Pa to the fourth image forming station Pd without being shifted, in a state that the paper P is reliably attracted on the transfer carrier belt 216.

On the other hand, a discharger 229 is provided approximately right above the drive roller 214 between the fourth image forming station Pd and the fixing apparatus 217. To this discharger 229 is applied an alternating current for separating the paper P electrostatically attracted on the carrier belt 216 from the transfer carrier belt 216.

In the digital color copying machine 1 having the above-described construction, a cut sheet paper is used as the paper P. When this paper P is fed from the paper feed cassette and supplied to the guide of the feed carriage passage of the paper feed mechanism 211, the tip portion of the paper P is detected by a sensor (not shown), and the paper P is stopped for a while by a pair of resist rollers 212 based on the detection signal output from the sensor.

Then, the paper P is fed onto the transfer carrier belt 216 rotating in the direction of an arrow Z in FIG. 1 with the timing being adjusted to each image station Pa to Pd. At this time, since predetermined charging is applied to the transfer carrier belt 216 by means of the attracting charger 228 as described above, the paper P is stably carried and supplied, while passing through each image station Pa to Pd.

At each image station Pa to Pd, a toner image of each color is formed, respectively, with a predetermined timing, and sequently overlapped on the supporting face of the carried paper P which electrostatically attracted by the transfer carrier belt 216.

When transfer of the image by means of the fourth image station Pd has been completed, the paper P is peeled off from the tip portion sequentially from the transfer carrier belt 216 by means of the discharger 229 for removing electricity, and guided to the fixing apparatus 217. Finally, the paper P on which the toner image is fixed is discharged onto the paper discharge tray 220 from a paper discharge port (not shown).

In the above description, photosensitive drum is scanned by the laser beams of the laser beam scanner units 227a to 227d and exposed, to thereby perform optical write onto the photosensitive drum 222. However, instead of using the laser beam scanner units, an optical writing system (LED head) comprising a light-emitting diode array and an focusing lens array may be used.

This LED head has a smaller size compared to the laser beam scanner unit, and is silent without having a movable portion. Hence, it can be used preferably in an image forming apparatus such as a tandem-type digital color copying machine or the like which requires a plurality of optical write units.

Above is a description of the overall construction of the digital color image forming apparatus (digital color copying machine 1).

Figure 2:
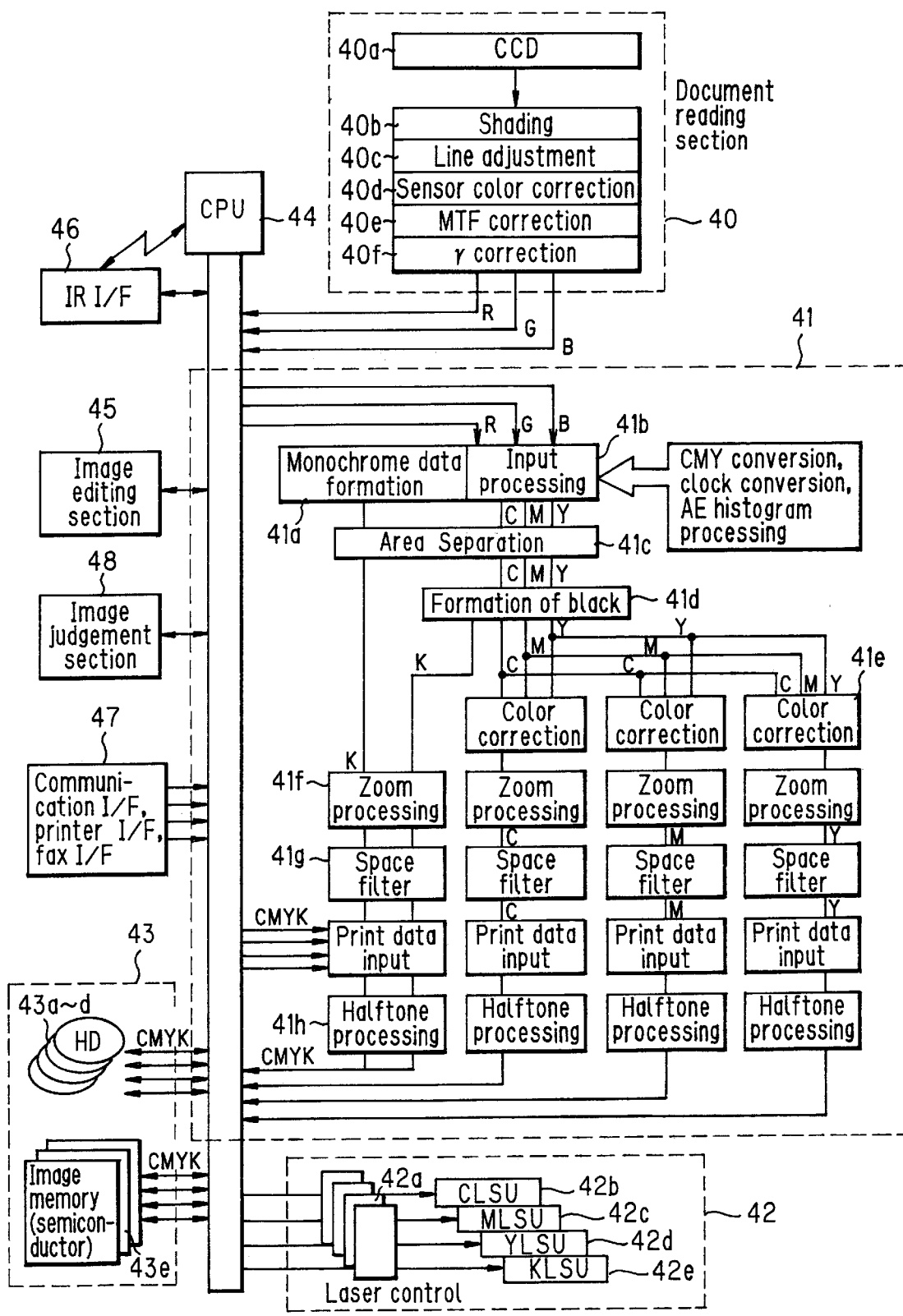
FIG. 2 is a block diagram of an image processing section of a digital color copying machine according to an embodiment of the present invention.

FIG. 2 shows a block diagram of an image processing in the digital color image forming apparatus 1.

The image processing section included in this digital copying machine 1 comprises an image data input section 40, an image processing section 41, an image memory 43 comprising a hard disk apparatus or a RAM (random access memory) and the like, an image data output section 42, a central processing unit (CPU) 44, an image editing section 45, external interface sections 46, 47 and an image judgement section 48.

The image data input section (document reading section) 40 is schematically constituted of: a shading correction circuit 40b for correcting a line image level of line data read by a three-line color CCD 40a which can read a black/white document or a color document image and output the line data color-separated into each color component of RGB; a line adjustment section 40c such as a line buffer for correcting drift of the image line data read by the three-line color CCD 40a; a sensor color correcting section 40d for correcting the color data of each color line data output from the three-line color CCD 40a; a MTF correction section 40e for correcting so that each pixel signal changes distinctively; and a γ correction section 40f for correcting the contrast of the image to thereby correct the visibility.

The image processing section 41 comprises: a monochrome data forming section 41a (black/white document) for forming monochrome data from the RGB signal which is a color image signal input from the image data input section 40; an input processing section 41b for converting the RGB signal to a YMC signal corresponding to each recording section of the recorder for clock-conversion; an area separation section 41c for separating the input image data into a character portion, a dot photograph and a photographic paper; a black forming section 41d for performing a ground color removal processing based on the YMC signal output from the input processing section 41b to form black; a color correction circuit 41e for adjusting each color of the color image signal based on the respective color conversion table; a zoom processing circuit 41f for converting the magnification of the image information input based on the set magnification; a space filter 41g; and a halftone processing section 41h for expressing the tone such as multi-valued error scattering and multi-valued dither method.

The respective color image data subjected to various processing in the image processing section 41 described above is stored in an image memory 43 for the time being.

The image memory section 43 comprises four hard disks (rotary storage media) 43a, 43b, 43c and 43d which receive 8-bit four color (32-bit) image data output serially from image processing section 41 in sequence, and while temporality storing it in a buffer, convert the 32-bit data into 8-bit four-color image data to thereby store and control it as the image data of each color.

Furthermore, since the position of the respective image stations Pa to Pd is different, respective color image data are stored for the time being in a delay buffer memory 43e (semiconductor memory) in the image memory section 43 to delay the time, respectively, thereby the image data is sent to each laser scanner unit with the timing adjusted to prevent color drift.

The image data output section 42 includes laser scanner units 42b, 42c, 42d and 42e of each color which performs laser recording based on a pulse width modulation signal corresponding to each color image signal output from the laser control unit 42a which performs pulse width modulation based on each color image data from the halftone processing section 41h.

The central processing unit (CPU) 44 is to control the image data input section 40, the image processing section 41, the image memory 43, the image data output section 42, the image editing section 45 described later and the external interface sections 46, 47 based on a predetermined sequence.

In addition, the image editing section 45 is to subject the image data stored in the image memory 43 for the time being through the image data input section 40, the image processing section 41 or the interface described later to a predetermined image editing.

Moreover, the interface 46 is communication interface means for receiving image data from an external image input processing apparatus (communication portable terminal, digital camera, digital video camera or the like) provided separately from the digital color copying machine 1. The image data input from the interface 46 is also input to the image processing section 41 for the time being to perform color space correction or the like to thereby be converted to the data level which can be handled with the image recording section 210 of the digital copying machine 1, and stored and controlled in the hard disks 43b, 43c, 43d and 43e.

Furthermore, the interface 47 is a printer interface for inputting the image data formed by a personal computer or the like, and a black/white or color FAX interface for receiving the image data received by a FAX.

The image data input from the interface 47 is already a CMYK signal, hence is subjected to the processing such as a halftone processing 41h in the middle of the image processing section 41 and stored and controlled in the hard disks 43b, 43c, 43d and 43e, respectively.

Then, the image judgement section 48 performs judgement whether or not the input document image data is negotiable securities such as paper currencies, and when it is judged that the image input from the image data input section 40 or the interface 47 is one of the negotiable securities, it is informed to the central processing unit (CPU) 44, to thereby control the subsequent image recording operation.

Figure 3:
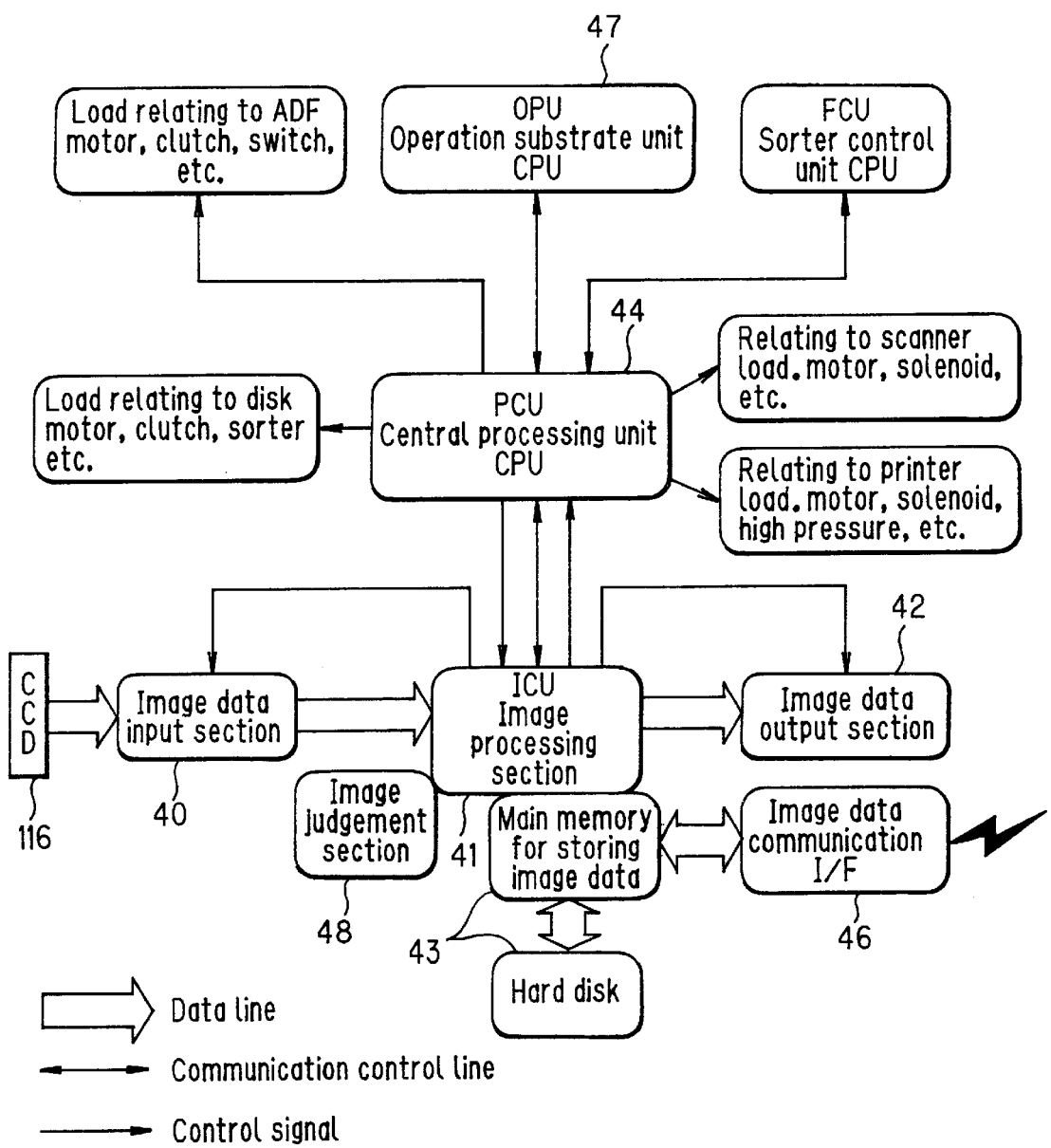
FIG. 3 is a control block diagram of a digital color copying machine according to an embodiment of the present invention.

FIG. 3 is a diagram showing a condition where the operation of each section of the apparatus constituting the digital color copying machine 1 is controlled by the central processing unit (CPU) 44.

The details of the image data input section 40, the image processing section 41, the image memory 43, the image data output section 42 and the image judgement section 48 are the same as described with reference to FIG. 2, therefore the description thereof is omitted.

The central processing unit 44 controls, by means of sequence control, each drive mechanism section constituting the digital copying machine 1, such as RADF, a scanner section, a laser printer section and the like, other than the above-described various blocks and outputs a control signal to each section. Moreover, an output signal from various sensors, serving as a confirmation of operation and a reference for the operation command timing is input from each drive mechanism section to the central processing unit 44.

Furthermore, to the central processing unit 44 are connected an operation panel and an operation substrate unit (OPU) 47 consisting of a CPU for controlling the entire operation panel in a state that two-way communication is possible, and a control signal indicating the copying mode content which is set and input by an operator is transferred to the central processing unit 44, according to the operation of the operation panel 75 (FIG. 4), to thereby controlling so that the entire digital color copying machine 1 operates according to the set mode.

Meanwhile, a control signal indicating various operation condition of the digital color copying machine 1 is transferred from the central processing unit 44 to the operation substrate unit 47, to thereby display the operation condition showing that the apparatus 1 is currently in which condition to the operator by means of a display section or the like on the operation substrate unit 47 side.

Furthermore, the central processing unit 44 also communicates mutually with a CPU for controlling a post-processing apparatus such as a sorter, a staple or the like, so that respective units perform an operation relative to each other.

Figure 4:
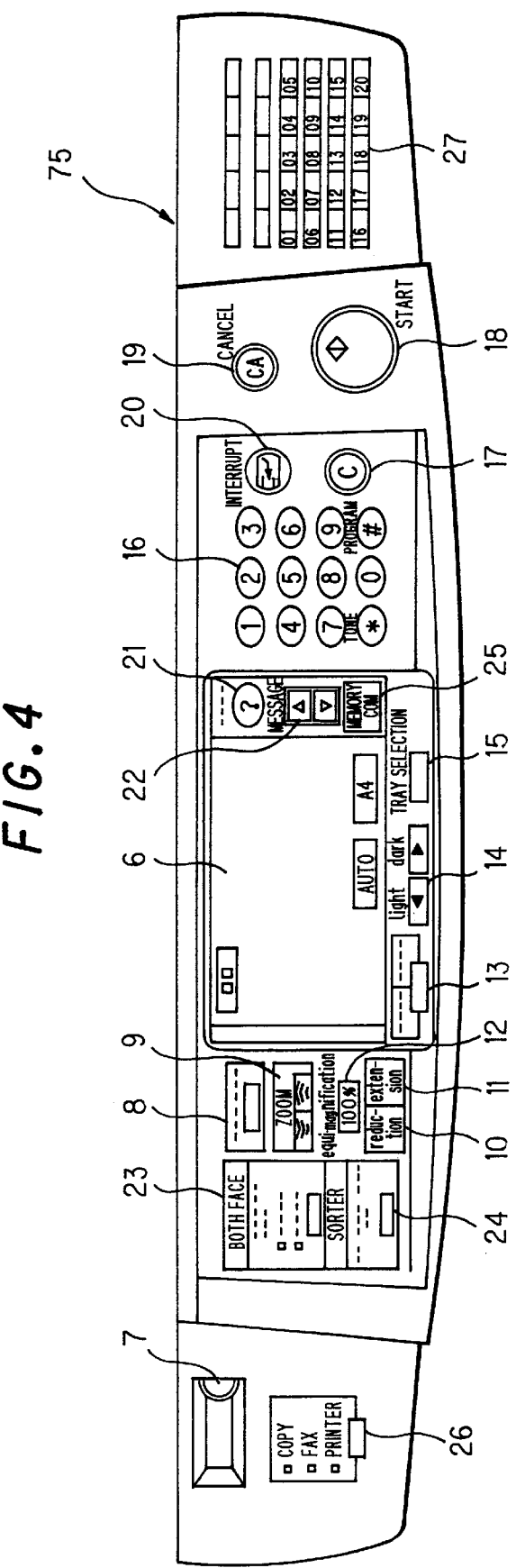
FIG. 4 is a front elevation of an operation panel of a digital color copying machine according to an embodiment of the present invention.

FIG. 4 shows one example of the operation panel 75 in the digital color copying machine 1. In the central part of the operation panel 75, a touch panel liquid crystal display device 6 is arranged, and a group of various mode setting keys is arranged around thereof.

On the screen of the touch panel liquid crystal display device 6, there is a screen changeover indication area for changing over to a screen for selecting the image editing function at all times, and when this area is operated by pushing it directly with a finger, various image editing functions are displayed in a list on the liquid crystal screen, enabling selection of various image editing functions.

Of the displayed various image editing functions, when an area where a function which the operator wants to perform is displayed is touched with a finger, the editing function is set.

Briefly explaining the group of various setting keys arranged on the above-described operation panel, a reference numeral 7 denotes a dial for adjusting the brightness of the screen of the liquid crystal display device 6. Numeral 8 denotes a magnification automatic setting key for setting a mode for automatic selection of magnification, 9 denotes a zoom key for setting the copying magnification at intervals of 1%, 10 and 11 denote a fixed magnification key for reading and selecting a fixed magnification, and 12 denotes an equi-magnification key for returning the copying magnification to the standard magnification (equi-magnification).

Numeral 13 denotes a density changeover key for changing over the copy density adjustment from automatic to manual or to photograph mode, 14 denotes a density adjustment key for setting the density level finely at the time of the manual mode or the photograph mode, 15 denotes a tray selection key for selecting a paper size desired among the paper sizes set in the paper feed section of the copying machine 1.

Numeral 16 denotes a number setting key for setting the number to be copied, 17 denotes a clear key for clearing the number to be copied or stopping the continuous copying halfway, 18 denotes a start key for indicating the initiation of copying, 19 denotes an entire cancellation key for canceling all the modes currently set and returning to the standard condition, 20 denotes an interrupt key for operated when another document is to be copied during a continuous copying, 21 denotes an operation guide key operated when the operator does not know how to operate the copying machine 1 and displaying a message regarding an operation method of the copying machine 1, and 22 denotes a message forward key for displaying the continuance of the message displayed by means of the operation of the operation guide key 21.

Numeral 23 denotes a double-sided mode setting key for setting the double-sided copying mode, and 24 denotes a post-processing mode setting key for setting an operation mode of the post-processing apparatus for sorting out the copies discharged from the copying machine 1.

Numerals 25 to 27 denote setting keys regarding the printer mode and the facsimile mode, and 25 denotes a memory transmission mode key for storing the transmitted document in the memory for a while and then transmitting it, 26 denotes a copy/fax/printer mode changeover key for changing over between copy mode, fax mode and printer mode of the digital copying machine 1, 27 denotes a one-touch dial key for storing telephone numbers to be dialed in advance, and at the time of transmission, dialing the destination with a one-touch operation.

The operation panel 75 and various keys arranged on the operation panel 75 described above is only an example, and it is a matter of course that according to various functions installed in the color digital copying machine 1, keys provided on the operation panel are different.

Figure 5:
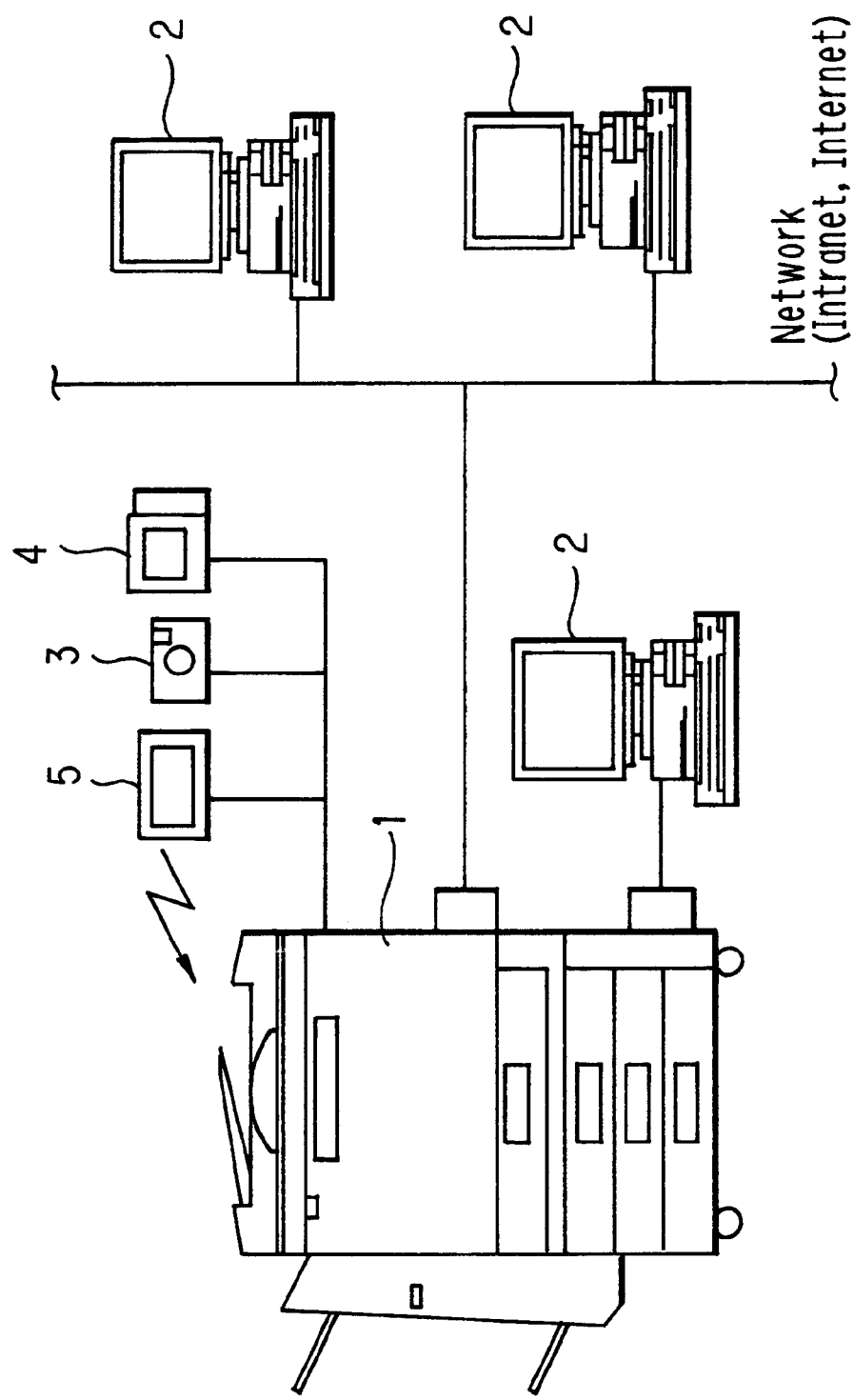
FIG. 5 is a diagram illustrating a network of a digital color copying machine according to an embodiment of the present invention.

FIG. 5 is a diagram showing a network system construction having a color digital copying machine 1 as a core, not a stand-alone color digital copying machine 1.

As an image information input method, the document information is input not only from the image reading section 110 (FIG. 1) (image data input section 40) of the color digital copying machine 1, but also the machine corresponds to the image information input from external equipment (interfaces 46, 47) connected to a network such as a personal computer 2, a digital camera 3, a digital video camera 4, a communication portable terminal 5 or the like.

In addition, the image information can be input from a remote area through Internet, Intranet or a communication infrastructure growing rapidly.

Accordingly, the digital copying machine for outputting these image information has a system construction that can perform an important role as a multi-function printer and a network printer, while having added value as seen from a user in addition to the functions of the digital copying machine.

Next is a description of a judgement process of the input image information of the above-described digital color copying machine, under a network environment.

First, the image judgement of the image information input via the image data input section 40 of the digital color copying machine 1 or the interfaces 46 and 47 will be described (see FIGS. 2 and 3).

Figure 6:
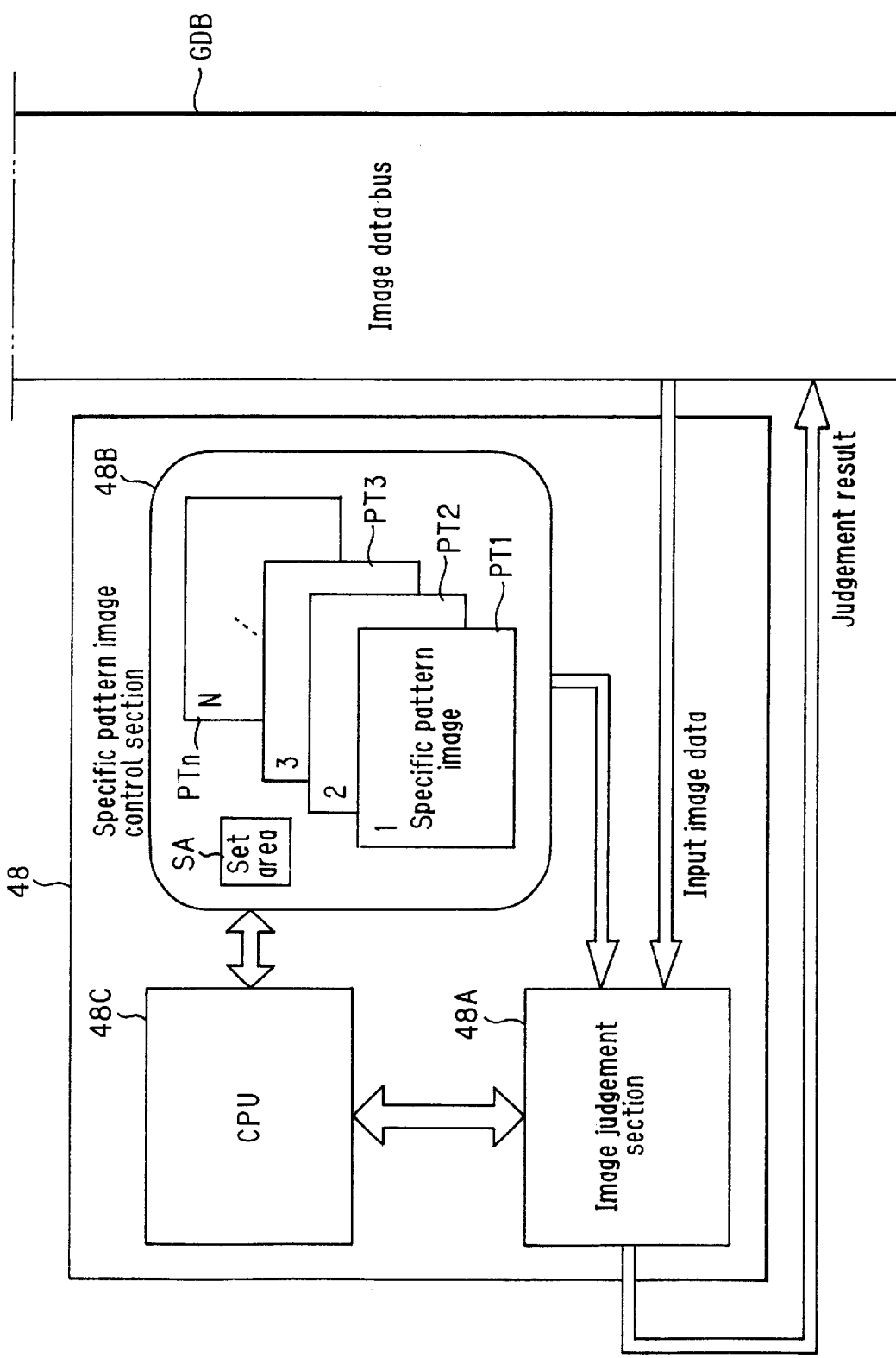
FIG. 6 is a control block diagram of an image judgement section of a digital color copying machine according to an embodiment of the present invention.

As the image judgement section 48 for performing image judgement whether a specific image data (negotiable securities) is included or not in the image data input to the digital color copying machine 1, as shown in FIG. 6, it is schematically constituted of an image judgement section 48A, a specific pattern image control section 48B, a central processing unit (CPU) 48C and the like.

The image judgement section 48A judges the image data input from the image data input section 40 or the like through the image data bus GDB, under control of the central processing units (CPU) 44, 48C, by a pattern matching processing using a specific pattern image tables PT1 to PTn sent from the specific pattern image control section 48B in sequence as a comparative data.

The specific pattern image control section 48B is a random-accessible data base, controls the information regarding the negotiable securities (paper currencies) of each country as specific pattern image tables PT1 to PTn, and transfers the respective specific pattern image control table data PT1 to PTn to the image judgement section 48A, in a predetermined order, based on the control signal from the central processing unit (CPU) 48C. In addition, the specific pattern image control table PT can be optionally added and changed.

Also, the specific pattern image control section 48B has a set area SA where the pattern matching processing results are stored as a historic information. In addition, the position where the set area SA is provided is not limited in the specific pattern image control section 48B, and it may be provided in any position.

With the above-described construction, the image data input from the document image reading section 110 of the color digital copying machine 1 is composed of color image data of RGB, and after various data corrections are performed, every time the document scanning units 113 and 114 of the document reading section 110 scans the document, the corrected data is input from the image data bus GDB to the image processing section 41. Incidentally, the exposure scanning of the document image at this time is repeated by the number of output copies with respect to one document, and every time the exposure scanning is repeatedly performed with respect to one document, the specific pattern image control tables PT1 to PTn to be required, of the plurality of specific pattern images, are sequentially changed over and sent to the image judgement section 48A, and pattern matching processing whether or not an image of negotiable securities is included in the images of the documents is performed.

The specific pattern image control tables PT1 to PTn prepared in plural numbers are designated as information regarding paper currencies of each country as described above in this embodiment. For example, in a "control table PT1", information regarding Japanese paper currencies is controlled, in a "control table PT2", information regarding American paper currencies, and in a "control table PT3" and "control table PT4", information regarding paper currencies of European countries are respectively controlled.

"Control table PT" is not limited to four control tables, and can be increased to any number, according to need.

Next is a description of judgement of input image data, regarding in which order the control tables PT1 to PTn of the plurality of specific pattern images are used.

In this embodiment, the setting data for diciding the application order of control tables PT1 to PTn of the plurality of specific pattern images are stored in the setting area SA, and are used to judge the image data input.

As the setting means of the data in the setting area SA, there are two setting methods: manual and automatic methods. As the standard of setting, first there is an environment, place or the like where the color digital copying machine 1 is installed, for example, when the copying machine 1 is used in Japan, it is so set that the "control table PT1" which controls the information regarding Japanese negotiable securities, which is considered to have the highest possibility to be used for forgery, is given priority for use. Similarly, when the copying machine 1 is used in the American market, it is so set that the "control table PT2" which controls the information regarding American negotiable securities is given priority for use. In addition, it can be optionally set as the "control table PT" which is given priority for use after that, and after having been set, the setting can be optionally changed or added. As the setting method, the operation panel 7 or a terminal 2 dedicated for control is used for optional setting, while the apparatus is in an adjustment mode.

Moreover, as the other setting methods, it is also possible to set such that the judgement historic information of the previous image (forgery) is stored and controlled, and the image judgement is performed by giving priority for use to the "control table PTn" which has been judged at high frequency to have high possibility of being a specific pattern image using the "control table PTn". Thereby, it is possible to reliably judge the characteristic of an image having possibility of being input frequently, and as a result, to improve precision of judgement (to suppress an illegal act).

Furthermore, by giving priority for use to the "control table PTn" which is judged that it might be a specific pattern image by the previous judgement(immediately before), it is also possible to judge an image input again (subsequently). This considers that there is a possibility of the same image to be repeatedly input, and as a result, precision of judgement can be improved (an illegal act can be suppressed).

The information such as a frequency of being judged that it might be a specific pattern image, and a history of the "control table PTn" which is judged that it might be a specific pattern image by the previous judgement of an image (immediately before), and the like is controlled in the information storage area in the specific pattern image control section 48B.

Furthermore, when a color image or the like serving as a medium to be copied is newly input to the color digital copying machine 1, the newly input image data and the information regarding the specific pattern image is compared in sequence, from the initial stage, that is, giving priority for use to the "control table PT1" set as a reference, and judged whether or not a specific pattern image is included in the input image data. Thereby, the judgement level can be made the same with respect to all the image information.

As described above, with this embodiment, the image judgement section 48 which performs image judgement whether or not a specific pattern image (negotiable securities) is included in the input image data prepares a plurality of specific pattern image control tables PT1 to PTn, by dividing characteristics of the negotiable securities of each country to be compared with the input image data by the pattern matching processing into each country, it becomes possible to perform the judgement processing while optionally changing over the order of the pattern matching processing for each country. Therefore, since the pattern matching processing after a complete match can be omitted, by processing from the specific pattern image control table PT1 to PTn having a high probability, the processing speed to the next copying can be increased.

Accordingly, it becomes possible to perform the judgement processing more smoothly than performing the image judgement such as a pattern matching or the like of the negotiable securities information of each country in a conventional manner, sequentially at all times according to the fixed order, such as an input order.

Moreover, as described above, since many pattern image information such as negotiable securities can be judged in a short period of time with a simple construction, the product price can be also suppressed without mounting a high-level processing (judgement) apparatus to the copying machine.

As described above, according to the invention of the first or second gist, smooth judgement and output processing can be performed by performing the judgement processing hierarchically, rather than by using the specific pattern image information controlled in a fixed format such as simply by an input order sequentially at all times for the image judgement such as pattern matching or the like.

Moreover, since many image information such as negotiable securities can be judged in a short period of time with a simple construction, the product price can be also suppressed without mounting a high-level processing (judgement) apparatus to the copying machine.

According to the invention of the third gist, of the plurality of specific pattern image information, any specific pattern image information can be optionally set to be given priority and used for judgement depending upon the environment where the apparatus is installed, hence the precision of judgement can be improved.

According to the invention of the fourth gist, of the plurality of specific pattern image information, which information is given priority and used for judgement can be set from the previous judgement history, hence characteristics of an image having a possibility of being input frequently can be reliably judged, and as a result, precision of judgement can be improved (illegal act can be suppressed).

According to the invention of the fifth gist, of the plurality of specific pattern image information, which control section is given priority and used for judgement can be set based on the previous judgement result, hence considering there is a possibility of inputting the same image information repeatedly, precision of judgement can be improved (illegal act can be suppressed) as a result.

According to the invention of the sixth gist, by judging the image while changing the plurality of specific pattern image information, with respect to the same image information repeatedly input, detection accuracy can be improved, and massive forgery of negotiable securities or the like can be prevented beforehand. Also, the product price can be suppressed without mounting a high-level processing apparatus to the copying machine, in order to judge many specific pattern images such as negotiable securities or the like in a short period of time.

According to the invention of the seventh gist, when new image information is input, specific pattern image information serving as a reference, of information control sections regarding a plurality of specific pattern image information, is used for judgement, hence the judgement level can be made the same with respect to all image information.

According to the invention of the eighth gist, since a plurality of specific pattern image information is divided into each country, to thereby collectively control the image information regarding negotiable securities (paper currencies) of that country, control of various information serving as the reference for judgement is easily understood, and maintenance such as addition of new information can be made easily.

What is claimed is:

1. An image processing apparatus comprising:
   an image input section for inputting an image information;
   an image output section for reproducing and outputting an image, based on the image information input from said image input section;
   an image judgement section for judging whether or not a specific pattern image is included in at least a part of the image information input to said image input section; and
   a control section for controlling reproduction and output of an image by using said image output section, based on the judgement result obtained at said image judgement section,
   wherein said image processing apparatus further comprises a specific pattern image control section for controlling a plurality of specific pattern image information, said image judgement section performs the presence judgement, with respect to the image information input from said image input section, by changing the application order of the plurality of specific pattern image information to make it applicable.

2. An image processing apparatus according to claim 1, wherein said image judgment section re-performs judgment by returning the specific pattern image information to the initial priority state, when the image information input from said image input section changes.

3. An image processing apparatus according to claim 1, wherein the specific pattern image information controlled by said specific pattern image control section is an image information regarding negotiable securities of each country.

4. An image processing apparatus having:
   an image input section for inputting an image information;
   an image output section for reproducing and outputting an image, based on the image information input from said image input section;
   an image judgement section for judging whether or not a specific pattern image is included in at least a part of the image information input to said image input section; and
   a control section for controlling reproduction and output of an image by using said image output section, based on the judgement result obtained at said image judgement section,
   wherein said image processing apparatus further comprises a specific pattern image control section for controlling a plurality of specific pattern image information, and
   a judgement order setting section for setting which specific pattern image information of the plurality of specific pattern image information is given priority and used for judging the image in sequence,
   said image judgement section performs the presence judgement, with respect to the image information input from said image input section, by changing the application order of the plurality of specific pattern image information to make it applicable, based on the priority set by said judgement order setting section.

5. An image processing apparatus according to claim 4, wherein said judgement order setting section sets the priority of the plurality of specific pattern image information, depending upon the destination of the apparatus to be shipped or the environmental situation in which the apparatus is installed.

6. An image processing apparatus according to claim 4, wherein said judgement order setting section gives priority to a specific pattern image information whose frequency that has been judged as a specific pattern image is high, by controlling the judgement history of the image obtained at said image judgement section.

7. An image processing apparatus according to claim 4, wherein said judgement order setting section gives priority to a specific pattern image information which has been judged to be a specific pattern image by the previous image judgement by said image judgement section.

8. An image processing apparatus according to claim 4, wherein said image judgment section re-performs judgment by returning the specific pattern image information to the initial priority state, when the image information input from said image input section changes.

9. An image processing apparatus according to claim 4, wherein the specific pattern image information controlled by said specific pattern image control section is an image information regarding negotiable securities of each country.

10. An image processing apparatus according to claim 1 or 4, wherein said image judgement section performs judgement while changing the specific pattern image information in sequence, with respect to the same image information repeatedly input from an image input section.

* * * * *